United States Patent [19]

Kuo

[11] 3,840,753

[45] Oct. 8, 1974

[54] TAPE READ AMPLIFIER AND LOGIC CIRCUIT

[75] Inventor: James Ren-Jye Kuo, Richardson, Tex.

[73] Assignee: Texas Instruments Incorporated, Dallas, Tex.

[22] Filed: Oct. 2, 1972

[21] Appl. No.: 294,428

[52] U.S. Cl. ............... 307/215, 307/235 R, 328/93, 328/94, 328/162

[51] Int. Cl. ....................... H03k 19/22, H03k 19/36

[58] Field of Search ................. 328/92, 93, 94, 162; 307/215, 218, 231, 235 R

[56] References Cited

UNITED STATES PATENTS 2,921,190 1/1960 Fowler, Jr. ...................... 307/218 X 3,147,443 9/1964 Mason et al. ..................... 328/94 X 3,713,022 1/1973 McRay ........................... 328/151 X

*Primary Examiner*—John Zazworsky

*Attorney, Agent, or Firm*—Harold Levine; James T. Comfort; James O. Dixon

[57] ABSTRACT

Disclosed is an improved logic gate circuit utilizing a flip-flop as a gating element to ineffectuate a noise portion of an input signal. A flip-flop and a gate circuit are responsive to the same input signals, and the flip-flop generates in response thereto a gating input signal to the logic gate to thereby gate out regions of possible noise. The improved logic gate is advantageously utilized in a high speed tape-read amplifier circuit providing both high and low level noise rejection in the NRZ mode.

29 Claims, 8 Drawing Figures

TAPE READ AMPLIFIER AND LOGIC CIRCUIT

This invention relates to improved logic gates and specifically to logic gates utilizing a flip-flop in combination with a conventional logic gate. Even more particularly a high speed tape read amplifier is provided utilizing the improved logic gate.

In today's high speed semiconductor integrated circuit technology wherein operating speeds are approaching 400 mega-hertz, such as in the advanced emitter-coupled-logic circuits, rejection of unwanted signal noise is essential. Ultra high speed circuitry is typically utilized in computer applications such as in serial-to-parallel and parallel-to-serial converters, ripple counters and data compressors. Another area wherein fast operating speeds is desired is in reading the input data into computers which is pre-recorded on magnetic tape. As magnetic tape and magnetic tape reading equipment become more sophisticated, higher tape reading speeds are achieved, and noise becomes of critical concern. High speed logic circuitry must respond to data inputs having a band-width approximating that band-width of noise spikes generated by the tape reading equipment and other external circuitry. Accordingly, various recording and playback formats have been developed in response to the high speed/-noise problem. Typical recording formats are the non-return to zero (hereafter referred to as NRZ) and non-return to zero inverted (hereafter referred to as NRZI) formats. Such formats are well-known in the art to suitably accommodate high density data recording systems having playback signal amplitude variations of 20 to 30 decibel.

Heretofore, conventional NRZ and NRZI systems have amplified the tape read-head signal and thereafter applied peak detection and clipping. The clipping circuit would provide a unidirectional digital output signal when the input signal was between preselected clipping levels to allow low level noise rejection. A differentiator in the peak detector provided an output signal having a value proportional to the slope of the input signal. Therefore, as the input signal traverses a peak, the peak detector signal would pass through its zero level. The zero detector circuit would detect this traversal through zero by the peak detector signal and would provide a narrow digital output in response thereto. By logically ANDing the clipping level circuit and the zero detector circuit, an output was provided only when the tape read input was within the predefined clipping thresholds.

However, such a circuit ignores the problem of high frequency noise on the tape read input when the magnitude of the input is within the threshold levels. As today's high speed logic AND and NAND circuits are responsive to these high frequency noise signals, new circuits and techniques are required to filter this noise before it actuates coupling circuitry and renders false data.

Accordingly, it is an object of the present invention to provide improved logic gate circuits operable at high frequency with improved noise threshold.

It is another object of the present invention to provide improved logic AND and NAND gates utilizing a gating signal as an additional input to the AND or NAND gate which is generated in response to the plurality of input signals.

It is a further object of the present invention to provide improved logic gates utilizing a flip-flop responsive to the inputs to the logic gate to provide a gating or filtering input signal to the logic gate to thereby selectively inactuate the gate's response.

It is still a further object of the present invention to provide an improved high-speed tape amplifier utilizing the improved logic gate having a flip-flop coupled to the input of the conventional logic gate.

It is yet another object of the present invention to provide a monolithic integrated circuit tape-read amplifier utilizing the improved logic gate and further comprising a clipping circuit, a zero detector circuit, and a filter and differentiator circuit to provide a playback signal with minimum skew and high noise immunity in NRZ and NRZI formats.

Briefly, and in accordance with the present invention, a conventional logic gate responsive to a plurality of input signals is also responsive to a flip-flop responsive to the plurality of input signals. A JK edge triggered flip-flop is set and reset by falling edges of the plurality of input signals to provide a disenable input signal to the logic gate.

Utilization of the improved logic gate in a tape read amplifier circuit comprising a filter and differentiator, clipping circuit, and zero detecting circuits to provide the plurality of input signals to the improved logic gate results in a high speed tape read amplifier circuit having increased noise immunity and minimal playback skew.

The novel features believed to be characteristic of this invention are set forth in the appended claims. The invention itself, however, as well as other objects and advantages thereof may best be understood by reference to the following detailed description when read in conjunction with the accompanying drawings, wherein:

Figure 1B:
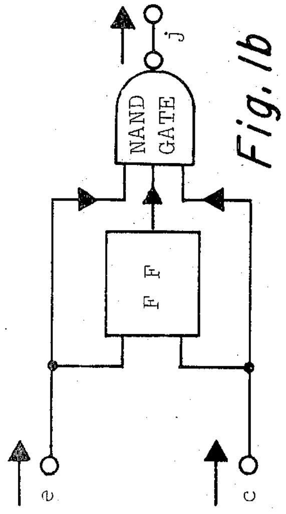
FIGS. 1A and 1B depict respectively AND and NAND logic gates coupled to a flip-flop in accordance with the present invention.
Figure 1A:
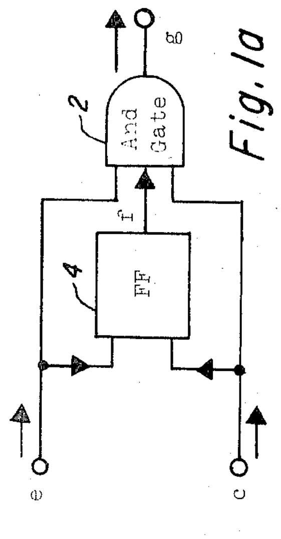

Referring now to the drawings there are depicted in FIG. 1A and FIG. 1B an improved logic AND gate and NAND gate respectively, in accordance with one aspect of this invention. The improved AND gate of FIG. 1A comprises a logic AND gate 2 in combination with a flip-flop circuit 4. Preferably, the AND gate is a Texas Instruments Ser. No. 7408(or 7413 inverted if hysteresis is desired) and the flip-flop 4 is preferably a Texas Instruments Ser. No. 5472 JK flip-flop. It is understood that other AND gates and other flip-flop circuits are suitably utilized within the scope of this invention. By utilizing an AND gate having hysteresis, such as the aforementioned TI Ser. No. 7413, with inverter, added noise immunity advantages are derived. TI Ser. No. 5472 is an edge triggered JK flip-flop, triggered on the falling edges of the input signals. AND gate 2 and flip-flop 4 are responsive to input signals *e* and *c*. In response to signals $e$ and $c$, flip-flop 4 generates a gating or disenabling logic input signal $f$ to the AND gate which advantageously prevents noise or false data on inputs $e$ and $c$ from being logically combined by gate 2 to provide output $g$.

Figure 3:
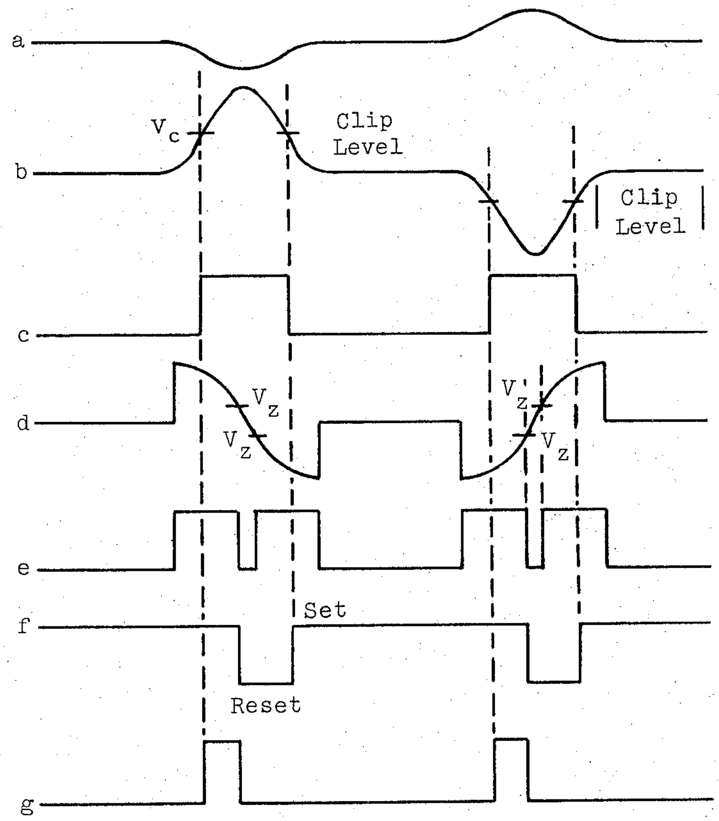
FIG. 3 depicts typical waveforms associated with the tape-read amplifier of FIG. 2.
Figure 4:
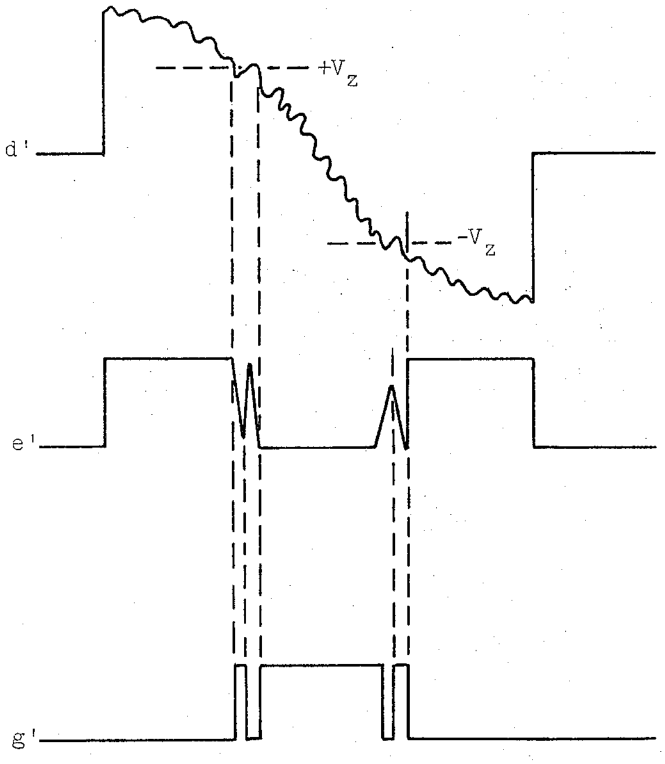
FIG. 4 depicts waveforms exhibiting how noise is generated in conventional tape-read amplifier circuits.

For example referring to FIGS. 3 and specifically waveforms $e$ and $c$, signal $c$ is an enable signal actuating the gate 2 to respond to any data contained in signal $d$. This data is depicted as a negative going pulse in FIG. 3 between the first set of dotted lines. It is noted that waveform $e$ is a "clean" waveform conspicuously absent of noise. Waveform $e'$ of FIG. 4 depicts a time expanded input $e$ having a pair of noise spikes leading and trailing the negative going data pulse. As would be readily apparent to one skilled in the art, without utilization of flip-flop 4 the output of AND gate 2 would be responsive to the noise spikes, and the waveform of $g'$ inverted in FIG. 4 would characterize the output. High speed AND gates operating in the frequency of 100 MHz are highly responsive to relatively narrow noise peaks. To remedy the above-defined noise problem, the combination of FIG. 1A is utilized and the output $f$ of flip-flop 4 is utilized as an additional input to AND gate 2. Referring again to FIG. 3 the waveforms $c$ and $e$ provide output $g$ in the combination of FIG. 1A. As above indicated, flip-flop 4 is a high speed, edge triggered, JK flip-flop and is actuated into the "reset" output state by the falling edge of the data pulse of waveform $e$. It is actuated into the "set" output state by the falling edge of enable signal $c$. The logical AND combination performed by gate 2 accordingly provides signal $g$ indicating the presence of a data signal within the time period of enable signal $c$. It is noted that utilization of such a circuit renders an output signal immune to erroneous data pulses caused by noise spikes. This is apparent when viewing waveform $e'$ as an input to the improved logic gate instead of clean waveform $e$. The pulse generated thereby preceeds the pulse which otherwise would be generated without flip-flop 4.

If a logical NAND function is desired, the combination depicted in FIG. 1B is utilized. Operation of the NAND combination of FIG. 1B is similar to that above-described in conjunction with FIG. 1A. A Texas Instruments Ser. No. 7413 suitably provides the NAND function and also features hysteresis.

Figure 2:
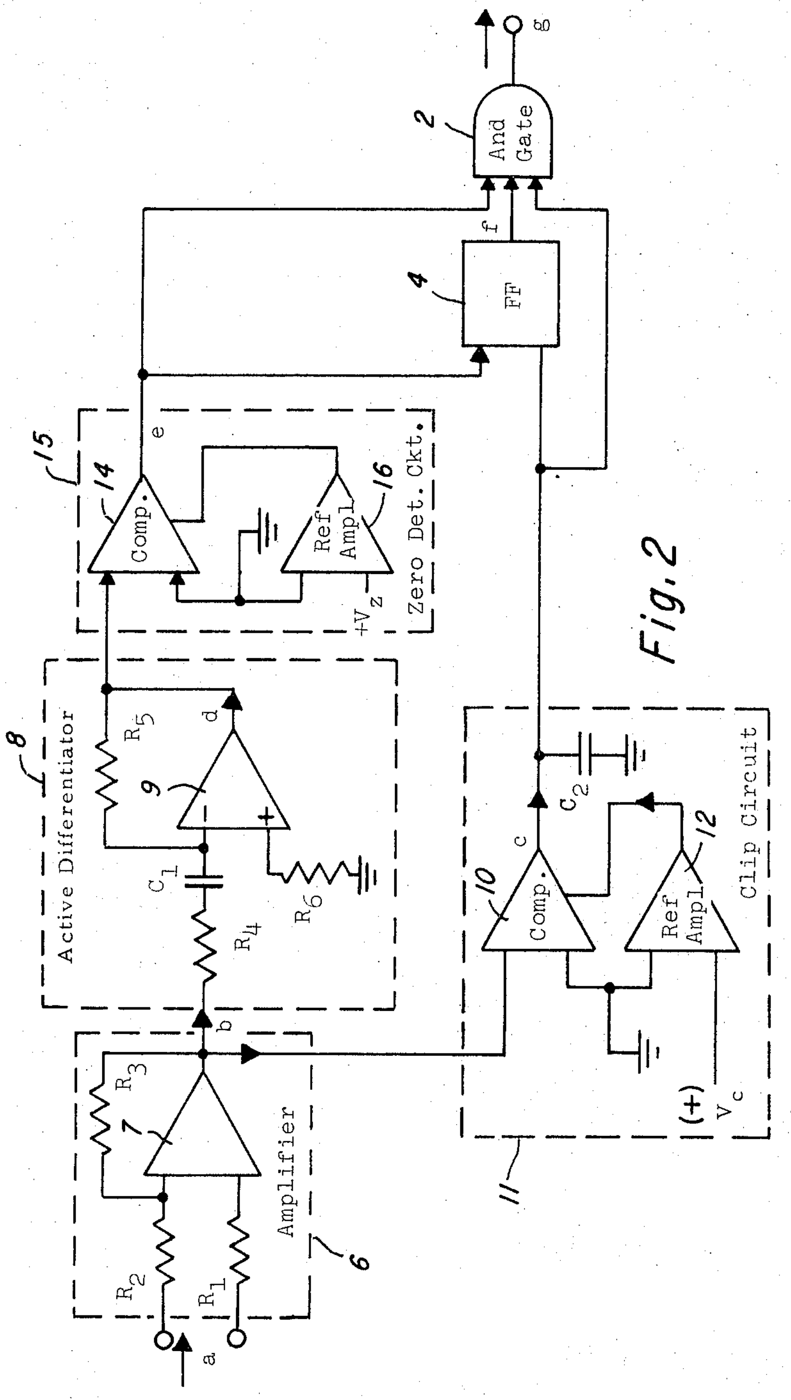
FIG. 2 is a block diagram of an improved tape-read amplifier circuit embodying the improved logic gate of FIG. 1.

Referring now to FIG. 2, there is depicted an improved tape-read amplifier circuit advantageously utilizing the AND gate combination of FIG. 1A. An amplifier circuit 6 couples the input signal from the tape-read head to an active filter and differentiator circuit 8 and to a clipping circuit 11. Filter and differentiator circuit 8 is coupled to a zero detector circuit 15 for detecting when the differentiator signal $d$ passes through a preselected range, preferably substantially zero. The clipping circuit output signal $c$ and the zero detecting circuit output $e$ are coupled to the flip-flop 4 and gate circuit 2 in accordance with FIG. 1A.

Amplifier 6 comprises an operational amplifier 7, which typically is a Texas Instruments Ser. No. 72741, having its output resistively coupled through resistor R3 to its input. Resistor R1 and R2 couple the input signal $a$ to input of amplifier 7.

The active filter and differentiator circuit 8 comprises operational amplifier 9 which typically is Texas Instruments Ser. No. 72741, and has its output resistively coupled to its negative input through resistor R5. The negative input is also coupled to amplifier circuit 6 by the series differentiator network R4 and capacitor C1. The positive input terminal of amplifier 9 is resistively coupled to circuit ground through resistor R6.

Clipping circuit 11 comprises comparator 10, and amplifier 12, which are provided in combination in Texas Instruments Ser. No. 7524. The positive reference terminal of reference amplifier 12 is adapted to receive $V_c$ bias voltage to establish the threshold clipping level and the output of amplifier 12 is coupled to comparator 10. One of the multiple inputs to comparator 10 and the negative reference terminal of amplifier 12 are commonly coupled to circuit ground. The other input of comparator 10 is coupled to amplifier 6 for receiving the amplified circuit from the tape-read head. The output of comparator 10 is capacitively coupled to circuit ground through filter capacitor C2, through which high frequency noise spikes are filtered.

Zero detector circuit 15 is similar to clipping circuit 11 comprising reference amplifier 16 and comparator 14, which typically are provided in combination by Texas Instruments Ser. No. 7524. The output of reference amplifier 16 is coupled to comparator 14. One input to comparator 14 and the negative reference input to reference amplifier 16 are commonly coupled to circuit ground. The positive reference input to reference amplifier 16 establishes a voltage range preferably centered at zero volts wherein comparator 14 provides an output whenever differentiator signal $d$ is therein. It is understood that other amplifiers and comparators besides those specifically above mentioned may be utilized in the spirit of the invention.

Operation of the high-speed tape reamplifier of FIG. 2 is best understood when viewing the waveforms of FIGS. 3 and 4. Signal $a$ typically represents the unamplified signal derived from the tape read-head in response to flux changes on the magnetic tape. Magnetic tape and tape read-head operating principals are well-known in the art, and, differential signal a is accordingly readily provided to both inputs of amplifier 6. Amplifier circuit 6 amplifies signal $a$ and provides signal $b$ to the active differentiator circuit 8 and to the clipping circuit 11. Whenever amplified signal $b$ exceeds threshold $V_c$ supplied to reference amplifier 12, the comparator 10 provides an output pulse represented in signal C as a positive pulse, or a logical 1 state, as opposed to a "0" logic state otherwise.

The active differentiator 8 comprises the combination of amplifier 9, resistor R4, R5, and R6 and capacitor C1 to provide filtered differentiator signal $c$ from signal $b$. Signal $d$ is shown as an analog signal changing from a positive polarity through zero to a negative polarity.

Reference amplifier 16 provides a range of voltages determined by voltage supply $V_z$ to the comparator 14. Whenever analog differentiator signal $d$ is within the voltage range $V_z$, the comparator 14 supplies output signal $e$ responsive thereto. Signal $e$ is shown in FIG. 3 as a negative going pulse whenever differentiator signal $d$ lies within voltage comparison range $V_z$.

Input signals $e$ and $c$ thereafter actuate the flip-flop 4 and AND gate circuit 2, as above described. Output signal $g$ indicates the presence of the data pulse of signal $b$ from the tape read-head with a high level of noise immunity. The embodiment of FIG. 2 provides only true data notwithstanding distortions and noise in the input signals caused by mechanical vibrations due to vacuum motors and mechanical movements or pulleys and idlers.

The embodiment of FIG. 2 provides an output in the NRZI format which is well-known in the art. A detailed discussion of NRZ and NRZI recording formats is provided by the Electronic Engineer, June, 1969, pp. 77–78. Therefrom it is obvious that the pulse of signal *e* is indicative of a peak in amplified signal *b* and accordingly of a signal in real time signal *a*. Applicant's choise of providing an output *g* indicative of the time immediately preceeding the pulse peaks indicated by signal *d* lying within the voltage range determined by $V_z$ advantageously eliminates false data readings to which conventional NRZ and NRZI circuitry is susceptible. It is understood that recording formats other than NRZ and NRZI which utilize AND/NAND gates are included within the spirit of this invention.

Figure 5A:
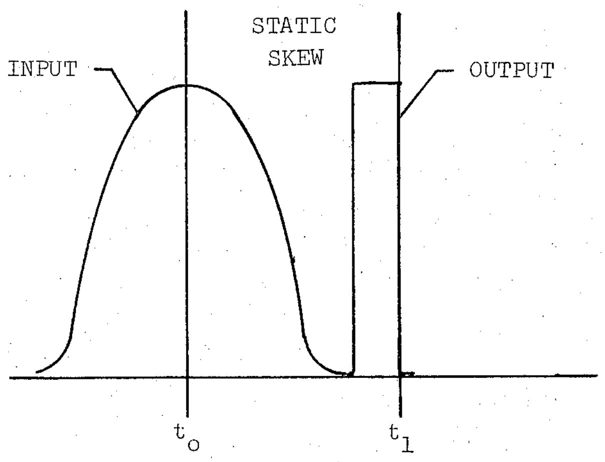
FIG. 5A–5C depicts waveforms of the embodiment of FIG. 2 defining static and dynamic skew.
Figure 5B:
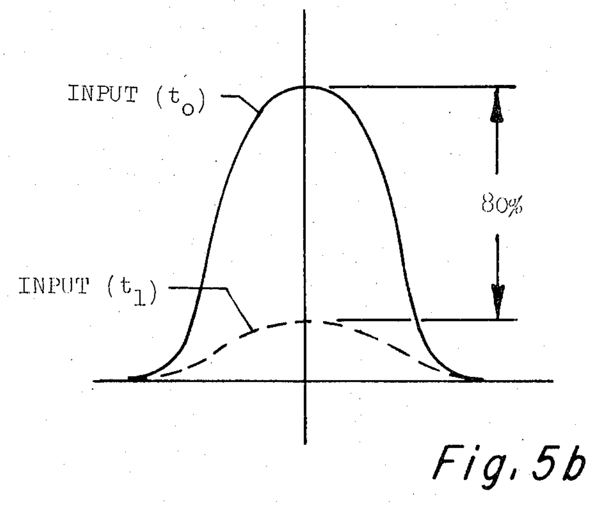
Figure 5C:
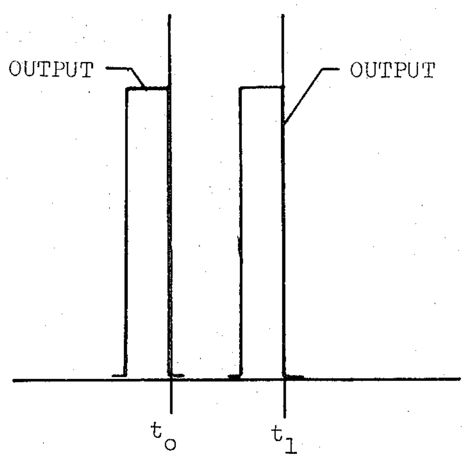

The waveforms in FIGS. 5A–5C depict static and dynamic skew conditions of the improved amplifier of FIG. 2. FIG. 5A depicts static skew defined on a full scale input signal as the percentage of the time displacement of the output transition to the logic one condition as actuated by a logic one input to the period between output transitions for an all ones data pattern.

FIGS. 5B–5C show static skew which is defined as the percentage change in time displacement around the static value when the amplitude of the input signal is reduced to 20 percent of the nominal value.

The high speed amplifier of this invention provides a static skew of less than 10 percent and dynamic skew of less than 5 percent.

As is well-known in the NRZ take format art, the width of the output pulse is a function of the input signal voltage and the value of the comparison levels of the zero detector circuit 11. The comparison levels $V_z$ are here provided at a minimum value to thus minimize skew time. However, skew time is directly related to the comparison levels, and to obtain a desired minimum skew time for a minimum input signal, then the output pulse-width when the maximum input signal is applied may conventionally be too narrow to drive the loading circuitry. Contrary to conventional NRZ circuitry, the output pulse is generated sufficiently wide to drive coupling circuitry even with $V_z$ set at the minimum value, due to the improved logic combination provided by the flip-flop 4. The desired output pulse width of the invention is not a function of the differentiator time constant or the zero detector comparison level. It is determined by the rising edge of the clip circuit output and by the negative going edge of the zero detector output signal. A relatively wider output pulse width is therefore able to be generated, enabling any practical logic circuits coupled thereto to be driven.

Static skew is further minimized by the active differentiator filter as no signal attenuation occurs during differentiation.

The embodiment of FIG. 2 is ideally suited for integrated circuit applications. Conventional ±5 volt supplies may be utilized to simplify design and lower power dissipation. The active differentiator replaces conventional passive differentiators to thereby provide an unattenuated signal with minimum skew, i.e., having a zero crossing occurring at approximately the peak of the input voltage.

Furthermore, the clipping circuit 11 requires only one reference voltage to perform the bipolar clipping function. Conventional circuits require a pair of operational amplifiers in conjunction with a pair of reference voltages to provide the comparison voltage range. Similarly, the zero detector circuit requires only one reference voltage to supply the voltage range desired.

The essential improvement feature in FIG. 2, is the inclusion of the flip-flop in the improved logic gating circuit. As noted earlier, only a negative going edge from the clipping circuit output can set the flip-flop into one logic state, and only a negative going edge from the zero detector circuit output can reset the flip-flop to the other state. Thus, after being reset by the falling edge of the zero detector circuit, the output will stay low as long as the clipping circuit output is high. Any noise spike following the zero detector output falling edge is filtered from the final output.

Conventional NRZ circuits utilize a gain controlled operational amplifier and internally generated noise therefrom is a function of the closed loop gain. The weaker the signal from the read-head, the lower is the signal to noise ratio at the output of the differentiator. This noise modulated weak signal FIG. 4*d'* can produce a false pulse at the zero detector output, FIG. 4*e'*, which can produce a false digital pulse at the output of the AND gate. The improved logic date output eliminates this noise problem, and the active differentiator allow unattenuated signal differentiation and a higher signal to noise ratio.

By utilization of an AND gate having hysteresis, noise spikes associated with the rising edge of the clipping circuit output (signal c) are filtered out with the addition of capacitor C2 from the clip circuit output to ground without effecting overall skew time.

Although a specific embodiment of a tape-read amplifier has been herein described in conjunction with the improved AND gate, it is understood that other embodiments are also suitably utilized within the scope of this invention. For example, the improved NAND gate of FIG. 1B is advantageously utilized in the spirit of this invention. Various modifications to the details of the functional combinations will be apparent to those skilled in the art, but without departing from the scope of the invention.

What is claimed is:

1. In an electronic logic circuit the combination comprising: a logic gate responsive to a plurality of logic input signals and a flip-flop coupled to said gate for generating another input logic signal thereto in response to said plurality.

2. The logic circuit according to claim 1 wherein said flip-flop is responsive only to said plurality.

3. The logic circuit of claim 2 wherein said logic gate is an AND gate.

4. The logic circuit of claim 2 wherein said logic gate is a NAND gate.

5. The logic circuit of claim 2 wherein said flip-flop is a J-K flip-flop which is actuated by the falling edges of said input logic signals.

6. The logic circuit of claim 3 wherein said plurality consists of two signals which respectively actuate said flip-flop into the set and reset state.

7. An improved logic element comprising a logic gate responsive to a plurality of input signals and a flip-flop also responsive to said plurality of input signals for generating another input signal to said logic gate.

8. The improved logic gate of claim 7 wherein said gate is a logic AND gate.

9. The improved logic gate of claim 7 wherein said gate is a logic NAND gate.

10. The improved logic gate of claim 7 wherein said flip-flop is an edge-triggered J-K flip-flop actuated by the falling edges of said plurality of input signals.

11. The logic element of claim 7 wherein said flip-flop is responsive only to said plurality.

12. A tape-read amplifier circuit responsive to a plurality of logic input signals for providing a logic output signal representing a logic combination of said input signals, the combination including:

a. a logic gate for generating said output signals in response to first, second and third input signals, and b. a flip-flop responsive to said first and second input signals for generating said third input signal.

13. The tape read amplifier circuit of claim 12 wherein said flip-flop circuit includes an edge-triggered J-K flip-flop actuated by the falling edges of said first and second input signals.

14. The tape-read amplifier circuit of claim 13 and further including:

a. clipping circuit means responsive to a fourth input signal for selectively providing said second input signal in a first binary state only when said fourth input signal exceeds a preselected threshold level;

b. differentiator means responsive to said fourth input signal to provide an analog differentiator signal; and c. a zero detector circuit responsive to said differentiator signal for providing said first input signal in a second binary state when said differentiator signal lies within a preselected magnitude range.

15. The tape-read amplifier circuit of claim 14 wherein said preselected magnitude range is substantially zero and said amplifier circuit comprises an NRZ amplifier.

16. The tape-read amplifier circuit of claim 15 wherein said differentiator means comprises an operational amplifier having an input capacitively coupled to receive said fourth input signal.

17. The tape-read amplifier circuit of claim 16 wherein said zero detector circuit comprises:

a. a reference amplifier responsive to a reference voltage signal for providing a reference voltage range; and b. a comparator for comparing said differentiator signal with said reference voltage range and for generating said first input signal in said second binary state.

18. The tape-read amplifier circuit of claim 17 wherein:

a. said reference amplifier has another input adapted to receive a bias voltage and has an output coupled to said comparator; and b. said comparator has an input coupled to said differentiator means and has an output to provide said first input signal.

19. The tape-read amplifier circuit of claim 18 wherein said clipping circuit means comprises:

a. a second reference amplifier responsive to second reference voltage signal for providing a second reference voltage range; and b. a second comparator for comparing said fourth input signal with said second reference voltage range and generating said second input signal in said first binary state.

20. The tape-read amplifier circuit of claim 19 wherein the output terminal of said second comparator is capacitively coupled to circuit ground.

21. The tape-read amplifier circuit of claim 20 and further including an amplifier circuit for providing said fourth input signal in an amplified condition.

22. The tape-read amplifier circuit of claim 12, wherein said logic gate circuit includes an AND gate to which said first, second, and third input signals are to be applied for generating said output signal.

23. The tape-read amplifier circuit of claim 12, wherein said logic gate circuit includes a NAND gate to which said first, second, and third input signals are to be applied for generating said output signal.

24. The tape-read amplifier circuit comprising:

a. clipping circuit means responsive to a first input signal for selectively providing a second input signal in a first binary state only when said first input signal exceeds a preselected threshold level;

b. differentiator means responsive to said first input signal to provide an analog differentiator signal;

c. a zero detector circuit responsive to said differentiator signal for providing a third input signal in a second binary state when said differentiator signal lies within a preselected magnitude range; and d. logic means responsive to said second and said third input signals for indicating the presence of data on said first input signal.

25. The tape-read amplifier circuit according to claim 24 wherein said logic means includes:

a. a flip-flop responsive to said second and third input signals for generating a fourth input signal; and b. a gate responsive to said second, third and fourth input signals.

26. The tape-read amplifier circuit according to claim 25 wherein said preselected magnitude range is substantially zero, and said amplifier circuit comprises an NRZ amplifier.

27. The tape amplifier according to claim 26 wherein said differentiator means comprises an operational amplifier having an input capacitively coupled to receive said first input signal.

28. The tape amplifier circuit according to claim 27 wherein said zero detector circuit comprises:

a. a reference amplifier responsive to a reference voltage signal for providing a first reference voltage range; and b. a comparator for comparing said differentiator signal with said first reference voltage range and for generating said first input signal in said second binary state.

29. The tape-read amplifier circuit according to claim 28 wherein said clipping circuit means comprises:

a. a second reference amplifier responsive to a second reference voltage signal for providing a second reference voltage range; and b. a second comparator for comparing said first input signal with said second reference voltage range and generating said second input signal in said first binary state.

* * * * *